United States Patent
Neumann

(10) Patent No.: US 10,459,891 B2
(45) Date of Patent: *Oct. 29, 2019

(54) REPLICATING DATA ACROSS DATA STORAGE DEVICES OF A LOGICAL VOLUME

(71) Applicant: Western Digital Technologies, Inc., Irvine, CA (US)

(72) Inventor: Charles A. Neumann, Lake Forest, CA (US)

(73) Assignee: Western Digital Technologies, Inc., San Jose, CA (US)

(*) Notice: Subject to any disclaimer, the term of this patent is extended or adjusted under 35 U.S.C. 154(b) by 614 days.

This patent is subject to a terminal disclaimer.

(21) Appl. No.: 14/870,943

(22) Filed: Sep. 30, 2015

(65) Prior Publication Data

US 2017/0091222 A1 Mar. 30, 2017

(51) Int. Cl.
| G06F 17/30 | (2006.01) |
| G06F 16/182 | (2019.01) |
| G06F 16/27 | (2019.01) |
| G06F 21/62 | (2013.01) |
| G06F 16/188 | (2019.01) |

(52) U.S. Cl.
CPC .......... *G06F 16/184* (2019.01); *G06F 16/188* (2019.01); *G06F 16/1824* (2019.01); *G06F 16/27* (2019.01); *G06F 21/6218* (2013.01)

(58) Field of Classification Search
CPC .. G06F 3/0607; G06F 3/0605; G06F 16/1824; G06F 16/188; G06F 16/184; G06F 21/6218

USPC ........................................................ 707/636
See application file for complete search history.

(56) References Cited

U.S. PATENT DOCUMENTS

| 5,897,661 | A | * | 4/1999 | Baranovsky .......... G06F 3/0608 707/999.202 |
| 6,499,054 | B1 | | 12/2002 | Hesselink et al. |
| 6,732,158 | B1 | | 5/2004 | Hesselink et al. |
| 7,120,692 | B2 | | 10/2006 | Hesselink et al. |
| 7,454,443 | B2 | | 11/2008 | Ram et al. |
| 7,467,187 | B2 | | 12/2008 | Hesselink et al. |
| 7,483,958 | B1 | | 1/2009 | Elabbady et al. |
| 7,546,353 | B2 | | 6/2009 | Hesselink et al. |
| 7,587,467 | B2 | | 9/2009 | Hesselink et al. |
| 7,600,036 | B2 | | 10/2009 | Hesselink et al. |
| 7,788,404 | B2 | | 8/2010 | Hesselink et al. |
| 7,844,775 | B2 | | 11/2010 | Snaman |
| 7,917,628 | B2 | | 3/2011 | Hesselink et al. |
| 7,934,251 | B2 | | 4/2011 | Hesselink et al. |
| 7,949,564 | B1 | | 5/2011 | Hughes et al. |
| 8,004,791 | B2 | | 8/2011 | Szeremeta et al. |

(Continued)

OTHER PUBLICATIONS

International Search Report and Written Opinion for PCT/US2016/054008, dated Jan. 11, 2017.

*Primary Examiner* — Jean M Corrielus
(74) *Attorney, Agent, or Firm* — Chang & Hale LLP

(57) ABSTRACT

Systems and methods are disclosed for replicating data across data storage devices of a logical volume. A data storage system may create a logical volume by grouping the multiple data storage devices together. The data storage devices may be external standalone data storage devices. The data storage system may also replicate data across the logical volume.

20 Claims, 8 Drawing Sheets

(56) References Cited

U.S. PATENT DOCUMENTS

| | | | |
|---|---|---|---|
| 8,140,794 B2* | 3/2012 | Prahlad | G06F 11/1451 707/639 |
| 8,255,661 B2 | 8/2012 | Karr et al. | |
| 8,285,965 B2 | 10/2012 | Karr et al. | |
| 8,341,117 B2 | 12/2012 | Ram et al. | |
| 8,341,275 B1 | 12/2012 | Hesselink et al. | |
| 8,352,567 B2 | 1/2013 | Hesselink et al. | |
| 8,484,356 B1 | 7/2013 | Douglis | |
| 8,526,798 B2 | 9/2013 | Hesselink | |
| 8,631,284 B2 | 1/2014 | Stevens | |
| 8,646,054 B1 | 2/2014 | Karr et al. | |
| 8,661,507 B1 | 2/2014 | Hesselink et al. | |
| 8,688,797 B2 | 4/2014 | Hesselink et al. | |
| 8,706,755 B2 | 4/2014 | Patel | |
| 8,706,777 B2 | 4/2014 | Sloo | |
| 8,713,265 B1 | 4/2014 | Rutledge | |
| 8,762,682 B1 | 6/2014 | Stevens | |
| 8,780,004 B1 | 7/2014 | Chin | |
| 8,793,374 B2 | 7/2014 | Hesselink et al. | |
| 8,819,443 B2 | 8/2014 | Lin | |
| 8,868,666 B1 | 10/2014 | Hellwege et al. | |
| 9,020,151 B1 | 4/2015 | Chen et al. | |
| 9,122,712 B1* | 9/2015 | Bono | G06F 17/30233 |
| 9,442,806 B1* | 9/2016 | Bardale | G06F 11/1453 |
| 9,529,950 B1* | 12/2016 | Sadooghi-Alvandi | G06F 17/5045 |
| 9,569,455 B1* | 2/2017 | Bono | G06F 17/30156 |
| 2005/0144195 A1 | 6/2005 | Hesselink et al. | |
| 2005/0144200 A1 | 6/2005 | Hesselink et al. | |
| 2006/0123062 A1 | 6/2006 | Bobbitt et al. | |
| 2010/0070466 A1* | 3/2010 | Prahlad | G06F 3/0605 707/609 |
| 2012/0036041 A1 | 2/2012 | Hesselink | |
| 2012/0079424 A1 | 3/2012 | Rogers | |
| 2012/0179886 A1* | 7/2012 | Prahlad | G06F 11/1451 711/162 |
| 2012/0266011 A1* | 10/2012 | Storer | G06F 11/1092 714/1 |
| 2013/0212401 A1 | 8/2013 | Lin | |
| 2013/0238872 A1* | 9/2013 | Prahlad | G06F 11/1451 711/162 |
| 2013/0266137 A1 | 10/2013 | Blankenbeckler et al. | |
| 2013/0268749 A1 | 10/2013 | Blankenbeckler et al. | |
| 2013/0268759 A1 | 10/2013 | Blankenbeckler et al. | |
| 2013/0268771 A1 | 10/2013 | Blankenbeckler et al. | |
| 2013/0304872 A1* | 11/2013 | Flynn | G06F 1/183 709/219 |
| 2014/0095439 A1 | 4/2014 | Ram | |
| 2014/0108615 A1 | 4/2014 | Takaya et al. | |
| 2014/0169921 A1 | 6/2014 | Carey | |
| 2014/0173215 A1 | 6/2014 | Lin et al. | |
| 2014/0351463 A1* | 11/2014 | Lin | G06F 3/0607 710/74 |
| 2016/0004721 A1* | 1/2016 | Iyer | G06F 17/30212 707/649 |
| 2016/0026672 A1* | 1/2016 | Zhang | G06F 16/13 707/686 |
| 2016/0100007 A1* | 4/2016 | Prahlad | G06F 3/0605 709/219 |

* cited by examiner

| File Name | Metadata | Original Drive | Copy Drives |
|---|---|---|---|
| (path1)/file1 | timestamp, file size, hash | Drive 2 | Drive 1, Drive 3 |
| (path2)/file2 | timestamp, file size, hash | Drive 3 | Drive 2 |
| (path3)/file3 | timestamp, file size, hash | Drive 1 | Drive 5 |
| (path4)/file4 | timestamp, file size, hash | Drive 2 | Drive 4, Drive 5 |
| (path5)/file5 | timestamp, file size, hash | Drive 3 | Drive 1, Drive 4 |
| (path6)/file6 | timestamp, file size, hash | Drive 5 | Drive 2, Drive 3, Drive 4 |
| ... | | | ... |
| (pathN)/fileN | timestamp, file size, hash | Drive 1 | Drive 5 |

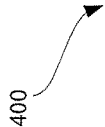

*FIG. 4*

REPLICATING DATA ACROSS DATA STORAGE DEVICES OF A LOGICAL VOLUME

BACKGROUND

Distribution of data storage across one or more data storage devices can provide increased data security through data redundancy. One type of data storage device may be a direct-attached storage (DAS) device. DAS devices may provide one or more computing devices with direct access to data via a connection cable (e.g., via a direct or physical connection). Another type of data storage device may be a network-attached storage (NAS) device. NAS devices may provide access to data over computer networks (e.g., via a wired and/or wireless network).

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 4 is a diagram of an example file list, according to an embodiment.

DETAILED DESCRIPTION

Figure 1:
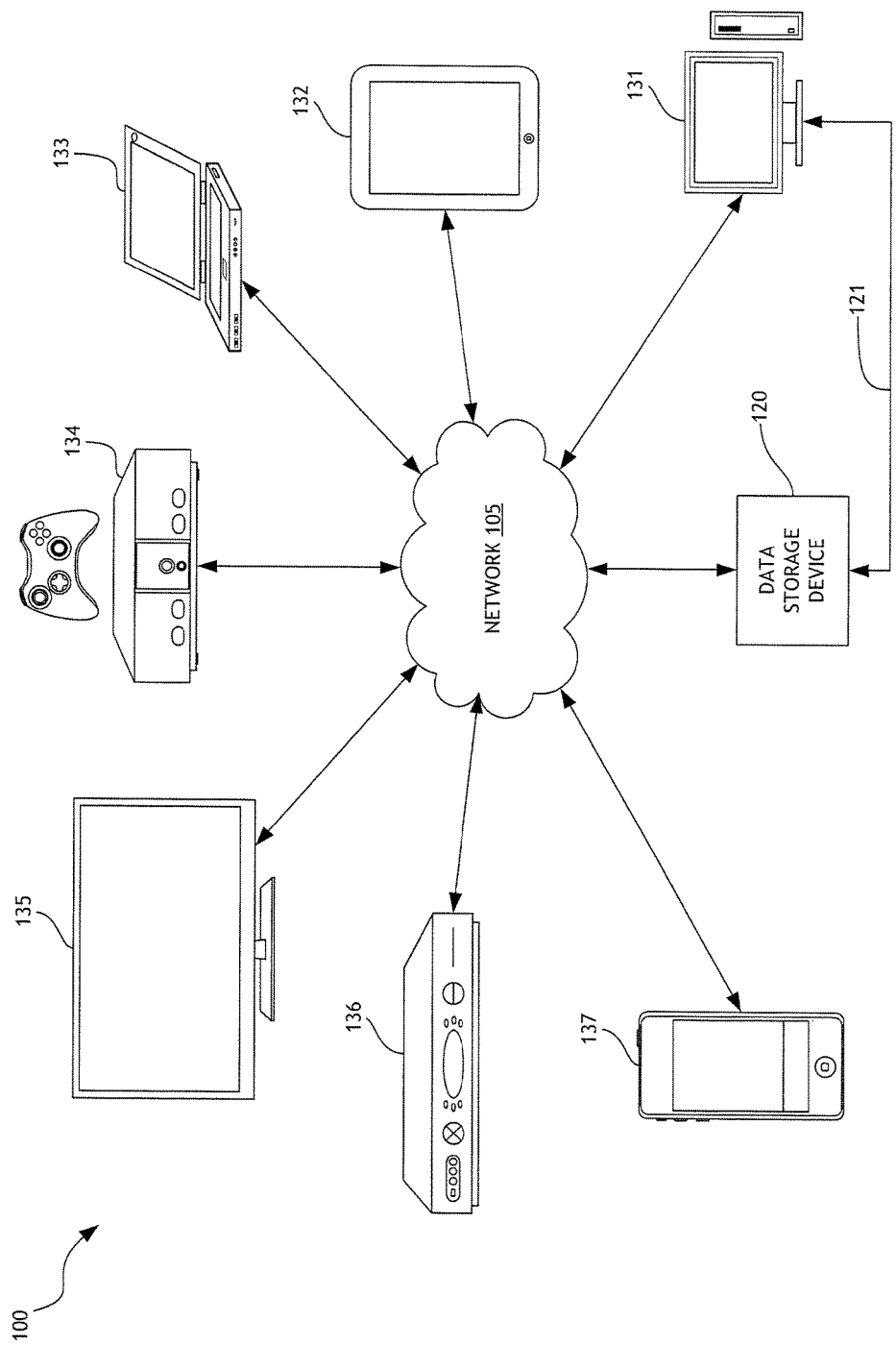
FIG. 1 is a diagram of a data storage system, according to an embodiment.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claimed invention. Disclosed herein are example implementations, configurations, and/or embodiments relating to replicating data (e.g., files) across a logical volume that may include multiple data storage devices (e.g., external standalone data storage devices).

Overview

Data storage devices/systems may provide one or more computing devices with file-level data storage. One example of a data storage device/system may be a DAS device. The DAS device may be coupled to a computing device (e.g., a laptop computer, a desktop computer, etc.) via a connection cable (e.g., a Thunderbolt cable, an external serial advanced technology attachment (eSATA) cable, a universal serial bus (USB) cable, etc.) coupled to a DAS interface (e.g., a communication interface such as USB 2.X, USB 3.X, Thunderbolt, eSATA, etc.) of the DAS device. A DAS device may provide a convenient mechanism for transferring data between computing devices, increasing the storage capacity (e.g., increase the storage space) of a computing device, and/or providing increased data security through data redundancy. Another example of a data storage device/system may be a NAS device. A NAS device may be coupled to a network via a NAS interface (e.g., a network interface or a communication interface such as Ethernet, 802.11 (Wi-Fi), etc.). A NAS device may provide file-level data storage over a network (e.g., a computer network), wherein access to the stored data is accessible to a group of clients. For example, a NAS device may include hardware, software, or a combination of such elements, configured such that the NAS device operates as a file server. NAS devices/systems can provide a convenient mechanism for sharing data among multiple computers and/or remotely accessing data stored on the NAS devices/systems. As compared to traditional file servers, benefits of NAS devices/systems may include the ability to access data from various locations (e.g., remote locations), faster data access, easier administration, and/or simpler configuration.

Certain embodiments disclosed herein provide the ability for multiple data storage devices (e.g., external standalone data storage devices such as portable hard drives, NAS devices/devices, etc.) to be grouped into a logical volume. The files stored on the multiple data storage devices may be replicated across the logical volume (e.g., copied onto other data storage devices in the logical volume). This may allow a user to leverage existing data storage devices to backup files and/or other data (to safeguard against data loss) more cheaply, more easily, more efficiently, and more quickly.

Data Storage Devices

FIG. 1 is a diagram of a data storage system 100, according to an embodiment. In the data storage system 100, a data storage device 120 may be communicatively coupled to one or more client devices (e.g., computing devices) in order to provide file-based data storage services to the one or more client devices (e.g., one or more computing devices). Types of client devices (e.g., computing devices) that may have access to the data storage device 120 may include, but are not limited to, phones 137 (e.g., smart phones, cellular phones, etc.), cable set-top boxes 136, smart TV's 135, video game consoles 134, laptop computers 133, tablet computers 132, desktop computers 131, wearable computers and/or other types of computing devices. In one embodiment, the data storage device 120 may be an external standalone data storage device. For example, the data storage device 120 may be a data storage device that is not located within a computing device (e.g., not within a case or housing of a computing device). In another example, the data storage device 120 may be a data storage device that may provide access to data without being directly coupled to a computing device (e.g., may be a NAS device).

The data storage device 120 device may provide various client devices (e.g., phones 137, cable set-top boxes 136, smart TV's 135, video game consoles 134, laptop computers 133, tablet computers 132, desktop computers 131) with access to various types of user data stored on the data storage device 120. The data storage device 120 may also allow users to store various types of user data on the data storage device 120. The data storage device 120 may comprise magnetic media, hard disk media, and/or solid-state media. While certain description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

With further reference to FIG. 1, the data storage device 120 (e.g., magnetic disk drive, hybrid hard drive, solid-state drive, etc.) may include a controller (not shown in FIG. 1) configured to receive data commands and to execute such commands in one or more non-volatile memory components of the data storage device 120. Such commands may include data read/write commands, and the like. The controller may be configured to receive data commands from a communication interface (e.g., a NAS interface and/or a DAS interface) residing on a computing device. Data commands may specify a block address in the data storage device 120 and data may be accessed/transferred based on such commands. The data commands may also be referred to as data access requests.

The data storage device 120 may be configured to store data in one or more magnetic recording disks and/or the solid state memory devices/arrays. In an embodiment, the data storage device 120 may comprise a cable box, a backup disk drive, a media storage unit, a streaming media device, a digital camera, or any other electronic device which may store data that may need to be accessed directly or wirelessly.

In certain embodiments, the data storage device 120 may store data received from a client device such that the data storage device 120 acts as data storage for the client device. To facilitate this function, the data storage device 120 may implement a logical interface. The logical interface can present to the client device memory as a set of logical addresses (e.g., sequential/contiguous addresses) where data may be stored. Internally, the controller may map logical addresses to various physical memory addresses in the non-volatile memory of the data storage device 120. Mapping data indicating the mapping of logical addresses to physical memory addresses may be maintained in the data storage device 120.

In one embodiment, the data storage device 120 may be a DAS device. The DAS device may be directly coupled to client device (e.g., a desktop computer 131) via a connection cable 121. The connection cable 121 may be coupled to a communication interface (e.g., a USB 2.X interface, a USB 3.X interface, a Thunderbolt interface, etc.) of the DAS device (e.g., data storage device 120). In another embodiment, the data storage device 120 may also be a NAS device. The NAS device may also be coupled to the client devices (e.g., computing devices) 131-137 via a network 105. The NAS device may be coupled to the network 105 via a network interface (e.g., an Ethernet interface, an 802.11 (Wi-Fi) interface, etc.). Each of the client devices 131-137 may also be coupled to the network 105 via a network interface. In one embodiment, network 105 may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof.

In one embodiment, the data storage device 120 may receive data access requests from the client devices 131-137 via the communication interface (e.g., a DAS interface such as USB 2.X, USB 3.X, Thunderbolt) and/or via the network interface (e.g., Ethernet, 802.11, etc.). The data access requests may be messages, commands, and/or requests to access data on the data storage device. For example, a data access request may indicate that a computing device wants to read data from the data storage device 120. In another example, a data access request may indicate that a computing device wants to write data to the data storage device 120.

Although data storage devices/drives/systems may provide various benefits, as described above, in certain configurations, such systems may be associated with various issues and/or drawbacks. Users may purchase different data storage devices (e.g., different external standalone data storage devices such as NAS devices, portable external hard drives, etc.) which may have different storage capacities, may have different storage media (e.g., magnetic media, solid state media, etc.), and may be manufactured by different companies/vendors. The user may store different data on each of the data storage devices (e.g., one portable external hard drive may store family photos, another portable external hard drive may store work-related documents, etc.). The user may not remember which files are stored on which data storage device. Even if the user does remember which files are stored on which data storage device, files may not be backed up unless the user remembers to perform a backup of the files. Although RAID systems may automatically backup files (and other data), RAID systems are often expensive which may discourage users from purchasing and/or using RAID systems. In addition, if one of the data storage devices in a RAID system fails or becomes inoperable, the RAID system may rebuild the failed data storage device which may be a time-consuming process (e.g., may take hours, or even days). Furthermore RAID systems may not be able to use data storage devices with different storage capacities (e.g., with different storage sizes) and/or different media.

It may be useful to provide a data storage system that is able to provide backup capabilities (e.g., is able to replicate or copy data, such as files) using multiple data storage devices (e.g., multiple external standalone data storage devices) of different storage capacities, different media, and/or manufactured by different vendors/companies. This may allow users to leverage their investment in existing data storage devices (e.g., existing external portable hard drives, NAS devices, etc.). The system may create a logical volume by grouping the multiple data storage devices together. The data storage system may also replicate data (e.g., automatically replicate/copy files) across the logical volume (as discussed in more detail below). The data storage system may provide RAID-like functionality without the costs associated with a RAID system. The data storage system may also allow additional storage space (e.g., add an additional external standalone data storage device such as a portable external hard drive) to be added more cheaply. The data storage system may also maintain the replication of the data when a data storage device is removed from the logical volume without rebuilding a drive (like a RAID system).

Figure 2:
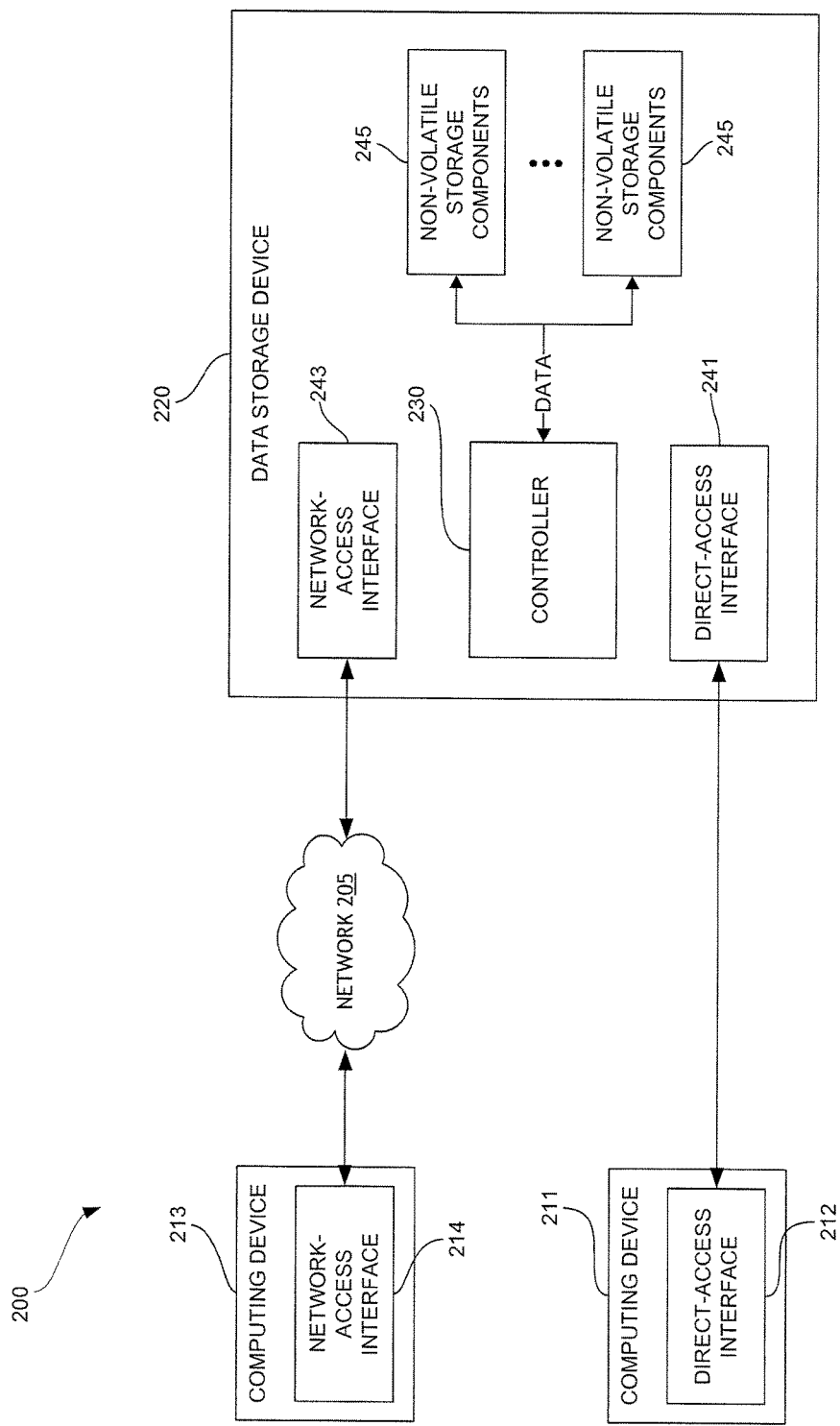
FIG. 2 is a diagram of a data storage system, according to an embodiment.

FIG. 2 is a diagram of a data storage system 200 according to an embodiment. The data storage system 200 includes a computing device 211, a computing device 213, a connection cable 250, and a data storage device 220. Each of the computing devices 211 and 213 may be a laptop computer, a desktop computer, a server computer, a tablet computer, a smart phone, a set-top box, a smart TV, a video game console, etc. The data storage device 220 may include a controller 230, a DAS interface 241 (e.g., USB 2.X, USB 3.X, Thunderbolt, eSATA, etc.), a NAS interface 243 (e.g., Ethernet, Wi-Fi, etc.), and non-volatile storage components 245. In one embodiment, the non-volatile storage components 245 may include non-volatile magnetic media, and/or solid-state memory, such as NAND flash. The controller 230 may provide overall control for the data storage device 220. In certain embodiments, the data storage device 220 may be a hard disk drive. The non-volatile storage components 245 may include one or more disks and the data storage device 220 may further include one or more heads (not shown) actuated radially over the disk(s), and a spindle motor for rotating the disk(s). Alternatively to, or in addition to, magnetic rotating media, solid-state memory and/or other non-volatile memory such as MRAM and/or phase change memory may be used. In certain embodiments, the data storage device 220 may be, for example, a hybrid hard drive including both magnetic media and solid-state media (e.g., the non-volatile storage components 245 may include both magnetic disks and solid state media/memory). In one embodiment, the non-volatile storage components 245 may be coupled to the controller via one or more serial bus connectors. Examples of serial bus connectors include, but are not limited to, serial ATA (SATA) connectors, peripheral component interconnect express (PCIe) connectors, and SATA Express connectors. In one embodiment, the data storage device 220 may be external standalone data storage devices (e.g., NAS devices/drives, portable external hard drives, etc.).

The controller 230 may receive data access requests (e.g., data and storage access commands) from a DAS interface 212 (e.g., a USB interface, a Thunderbolt interface) of the computing device 211. Data access requests communicated by the DAS interface 212 may include write and read commands issued by the computing device 211. The data access requests may specify a LBA, or range of LBAs, in the data storage device 220, and the controller 230 may execute the received data access requests in the non-volatile storage components 245. The controller 230 may also receive data access request from a NAS interface 214 (e.g., a communication interface such as an Ethernet interface, a Wi-Fi interface, etc.) of the computing device 213. The controller may determine an LBA and/or a range of LBAs in the data storage device 220 based on the data access requests and may execute the received data access requests in the non-volatile storage components 245. In a hybrid hard drive, data may be stored in a magnetic media storage component as well as non-volatile solid-state memory.

The data storage device 220 may store data received from the computing devices 211 and 213, such that the data storage device 220 acts as memory for the computing devices 211 and 213. To facilitate this memory function, the controller 230 may implement a logical interface. The logical interface may present to the computing devices 211 and 213 the memory of the data storage device 220 as a set of logical addresses (e.g., contiguous address) where data can be stored. The controller 230 may map logical addresses to various physical memory addresses in the non-volatile storage components 245 and/or other memory module(s).

The data storage device 220 may be configured to implement data redundancy, wherein user data stored in the non-volatile storage components 245 is maintained in one or more internal and/or external drives. For example, the controller 230 may include a data redundancy management module (not shown in FIG. 2) configured to implement redundancy functionality. The data redundancy management module may implement redundant array of independent disks (RAID) technology, wherein the non-volatile storage components 245 includes a plurality of internal drives, disks, or other data storage partitions combined into a logical unit for the purposes of data redundancy and performance improvement. In addition, or alternatively, the data redundancy management module may be configured to implement RAID using one or more internal memory modules in combination with one or more external memory devices, as discussed in greater detail below.

For RAID purposes, the non-volatile storage components 245 may include an array of one or more storage devices, such as hard disks or other memory modules that are configured to store user data. In certain embodiments, such internal memory modules/disks may be each directly coupled to the controller 230 to provide a high bandwidth interface for reading and writing user data. The non-volatile storage components 245 may include one or more additional memory modules configured to store parity information.

The controller 230 may be configured to divide and replicate user data among the physical RAID memory modules, providing storage virtualization; the array may be accessed by the computing devices 211 and 213 as a single drive. Data may be distributed across the RAID memory modules/drives according to any desirable or practical RAID level, depending on the level of redundancy and/or performance desired. For example, the data storage device 220 may be configured to implement RAID 0, RAID 1, RAID 5, RAID 6, RAID 10, other RAID technology, or other erasure coding technology, depending on data reliability, availability, performance and/or capacity considerations or requirements.

The computing device 211 may be coupled to the data storage device 220 via connection cable 250. The connection cable 250 may directly connect the computing device 211 and the data storage device 220. The connection cable 250 may use one or more communication interfaces (such as a bus interface) and/or protocols that may allow the computing device 211 to communicate with the data storage device 220. The DAS interface 212 and 241 may be USB interfaces, Thunderbolt interfaces, serial attached SCSI (SAS), eSATA interface, etc.

In one embodiment, the connection cable 250 may include one or more data lines (e.g., one or more wires, pins, etc.) that allow the computing device 211 to communicate data with the data storage device 220. For example, the connection cable 250 may include data lines (not shown in FIG. 2) that the computing device 211 may use to read data from and/or write data to the data storage device 220. The computing device 211 may communicate data to and from the data storage device using the DAS interface 212 (e.g., via the DAS interface 212). In another embodiment, the computing device 211 may provide an input voltage to the data storage device 220 and the data storage device 220 may use the input voltage to operate one or more components of the data storage device 220 (e.g., the controller 230, the non-volatile storage components 245, a motor, etc.). The connection cable 250 may include one or more voltage lines (e.g., wires, pins, etc.) that may receive the input voltage from the computing device 211 via the DAS interface 212. The one or more voltage lines may provide the input voltage (received from the computing device 211) to the data storage device 220 via the communication interface 240. In a further embodiment, the data storage device 220 may be coupled to a separate power source (e.g., may be coupled to a battery, to an AC adaptor, to a wall outlet, etc.).

In one embodiment, the connection cable 250 may include a bridge unit (not shown in FIG. 2). For example, the connection cable 250 may include a USB bridge, a Thunderbolt bridge, or other type of bridge. The bridge unit may translate between two different types of communication interfaces and/or protocols. For example, if a connected storage device communicates in a first protocol, but not a second protocol, the bridge unit may translate the second protocol to the first protocol, or vice versa.

The computing device 213 may be communicatively coupled to the data storage device 220 via a network 205 (e.g., one or more of a Wi-Fi network, a LAN, a cellular network, etc.). The computing device 213 may send data (e.g., files, images, movies, etc.) and/or data access requests to the data storage device 220 via the NAS interface 214 (e.g., a communication interface an Ethernet interface, a Wi-Fi interface, etc.) and the network 205. The data storage device 220 may receive the data and/or data access requests from the computing device 213 via the NAS interface 243.

In one embodiment, a data storage system may use multiple data storage devices (e.g., multiple data storage devices 220) to create a logical volume by grouping the multiple data storage devices together, as discussed in more detail below. The data storage system may also replicate data across the logical volume to provide RAID-like functionality without the costs associated with a RAID system, as discussed in more detail below.

Replicating Data Across a Logical Volume

Figure 3:
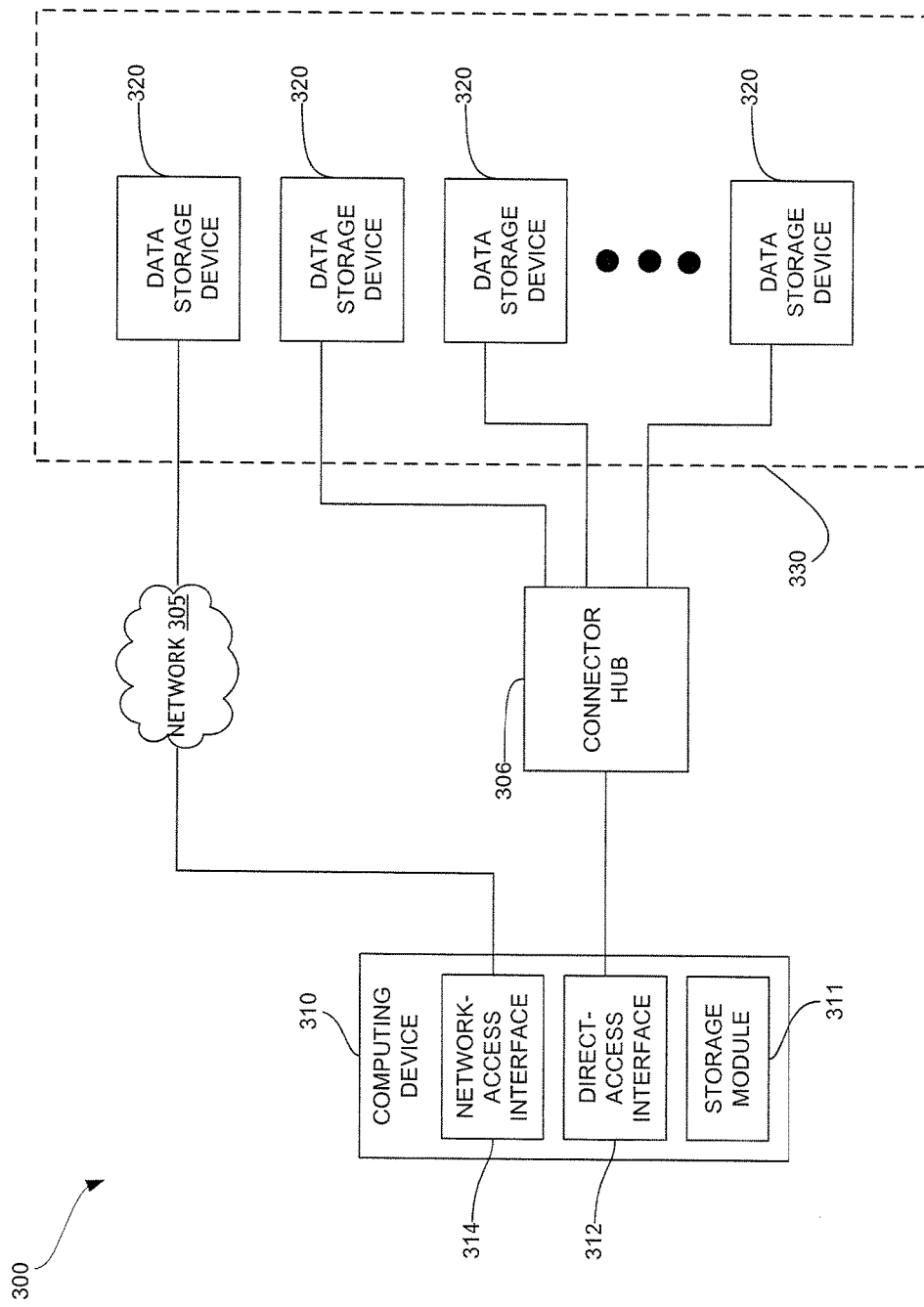
FIG. 3 is a diagram of a data storage system, according to an embodiment.

FIG. 3 is a diagram of a data storage system 300 according to an embodiment. The data storage system 300 includes a computing device 310, a network 305, a connector hub 306, and a logical volume 330. The network 305 may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof. The connector hub 306 may include multiple DAS interfaces (e.g., multiple connectors) that allow the connector hub 306 to be coupled to multiple data storage devices 320 and the computing device 310. For example, the connector hub 306 may be a USB hub that includes multiple USB ports/interfaces. Although the connector hub 306 is illustrated in FIG. 3 as being separate from the computing device 310, it shall be understood that in other embodiments, the connector hub 306 may be part of the computing device 310. In one embodiment, the computing device 310 may be a NAS device.

The logical volume 330 includes multiple data storage devices 320. In one embodiment, the logical volume 330 may be a logical grouping or a set of data storage devices. The logical volume 330 may also be referred to as a set of data storage devices. The data storage devices 320 may be each be a NAS device and/or a DAS device. The data storage devices 320 may include different types of media. For example, the data storage devices 320 may include magnetic media, hard disk media, and/or solid-state media. In one embodiment, the data storage devices 320 may be external standalone data storage devices. For example, the data storage devices 320 may be external standalone NAS devices, or external DAS devices (e.g., portable external hard drives).

The computing device 310 includes a DAS interface 312 (e.g., a communication interface such as USB 2.X, USB 3.X, Thunderbolt, eSATA, etc.) and a NAS interface 314 (e.g., a network/communication interface such as Ethernet, 802.11 (Wi-Fi), etc.). The DAS interface 312 is coupled to the connector hub 306 which allows the computing device 310 to communicate (e.g., transmit and/or receive data) with the data storages devices 320 coupled to the connector hub 306. The NAS interface 314 is coupled to the network 305 which allows the computing device 310 to communicate (e.g., transmit and/or receive data) with the data storage device 320 coupled to the network 305. The computing device 310 also includes a storage module 311.

In one embodiment, the storage module 311 may create the logical volume 330. For example, the storage module 311 may receive input (e.g., user input received from a graphical user interface (GUI) presented/provided by the storage module 311, parameters from a configuration file, etc.) that identifies the data storage devices 320 that are to be included in the logical volume 330. The storage module 311 may group and/or aggregate the data storage devices 320 into a set of data storage devices (e.g., may associate the data storage devices 320 with the logical volume 330 or may include the data storage devices 320 in the logical volume 330). Files stored on the data storage devices 320 may be replicated (e.g., copied) onto one or more other data storage devices 320 in the logical volume 330, as discussed in more detail below.

In one embodiment, the storage module 311 may receive input (e.g., user input from a GUI presented/provided by the storage module 311, parameters from a configuration file, etc.) that indicate how much storage space on each of the data storage devices 320 should be allocated for replicating files. The storage module 311 may allocate the indicated amount of storage space on each of the data storage devices 320 for replicating files (as discussed in more detail below). For example, the storage module 311 may allocate one gigabyte of storage space on each data storage device 320 for replicating files.

In one embodiment, the storage module 311 may identify a set of files (e.g., one or more files) stored on a data storage device 320 that are to be replicated across the logical volume 330 (e.g., that are to be copied onto one or more other data storage devices 320 of the logical volume). The storage module 311 may identify the set of files based on file types. For example, the storage module 311 may identify image files (e.g., files that include digital images), video files (e.g., files that include digital videos), word processing files/documents, etc. The storage module 311 may also identify the set of files based on file sizes. For example, the storage module 311 may identify files that are greater than a threshold size (e.g., greater than one megabyte), less than a threshold size (e.g., less than one hundred megabytes), and/or between a range of sizes (e.g., between five and fifty megabytes). The storage module 311 may also identify the set of files based on the number of times the files have been accessed. For example, the storage module 311 may identify files that have been accessed more than a threshold number of times or less than a threshold number of times. The storage module 311 may also identify the set of files based on the extensions (e.g., file extensions) of the set of files. For example, the storage module 311 may identify files that have a ".jpg" extension (e.g., Joint Photographic Experts Group (JPEG) files). In another example, the storage module 311 may identify files that have a ".mpg" extension (e.g., Motion Picture Experts Group (MPEG) files). The storage module 311 may also identify the set of files based on input received from a user. For example, a user may select one or more files via a GUI (presented/provided by the storage module 311) to identify the set of files. In another example, a user may select a folder via the GUI and the storage module 311 may identify the files in the folder and subfolders of the folder.

In one embodiment, the storage module 311 may determine a protection level for the set of files. The set of files may be replicated across the logical volume 330 based on the protection level, as discussed in more detail below. In one embodiment, the protection level may be data/information indicative of a priority or an importance of the set of files. For example, a higher protection level may indicate that the set of files has a higher importance (or higher priority) and a lower protection level may indicate that the set of files has a lower importance (or lower priority). It shall be understood that in some embodiments, different numbers of protection levels may be used (e.g., two protection levels, five protection levels, etc.). The storage module 311 may create more copies of a set of files more when the protection level is higher and may create fewer copies of the set of files less when the protection level is lower. For example, the storage module 311 may copy the set of files onto more data storage devices 320 (e.g., four data storage devices 320) when the protection level is higher and may copy the set of files onto fewer data storage devices 320 (e.g., two data storage devices 320) when the protection level is lower. In another embodiment, the protection level may be data/information indicative of a how many copies of the set of files should exist across the logical volume 330. The protection level may indicate the number of data storage devices 320 that the set of files should be replicated on (e.g., copied on) and/or may indicate the number of copies of the set of files. For example, a protection level of "3" may indicate that the set of files should be copied onto three different data storage devices 320 (e.g., there should be three copies of the set of files across the logical volume 330). In one embodiment, the storage module 311 may maintain a minimum number of copies of a file exists across the logical volume based on the protection level. For example, the storage module 311 may maintain at least two copies or at least three copies of a file on different data storage devices 320 of the logical volume 330. In one embodiment, the protection level may be applied across the logical volume 330. For example, the protection level may indicate the minimum number of copies of a file (or set of files) that the storage module 311 should maintain across all of the data storage devices 320 of the logical volume 330.

In one embodiment, a user may update the protection level for a file or a set of files. For example, the user may provider user input (via a GUI provided/present by the storage module 311) to indicate that the protection level for a file should be increased or decreased. The storage module 311 may create additional copies of the file and/or remove copies of a file based on the updated protection level. The storage module 311 may update the file list to indicate that copies of the filed have been created or removed. The storage module 311 may also update the file list to indicate that the protection level for a file or set of files has been updated.

In one embodiment, different sets of files may be associated with different protection levels. For example, a user may indicate that image files (e.g., family pictures) should have a high protection level and may indicate that music files (e.g., digital music files such as MPEG-2 Audio Layer III (MP3) files) should have a lower protection level. The storage module 311 may receive data indicative of the protection levels via a GUI (which may be provided/presented by the storage module 311).

As discussed above, the storage module 311 may replicate one or more sets of files across the logical volume 330. For example, a first file stored on a first data storage device 320 (of the logical volume 330) may be replicated (e.g., copied) onto one or more additional data storage devices 320 (of the logical volume 330) based on the protection level. In one embodiment, the store module 311 may identify the one or more additional data storage devices 320 to replicate the set of files on, based on one or more storage parameters. Examples of storage parameters may include, but are not limited to, a type of the first file (e.g., image file, video file, word processing document/file, etc.), a size of the first file, one or more health statuses of the one or more additional data storage devices 320, and a number of times the first file has been accessed. In one embodiment, the set of files stored on a data storage device may be unique across the logical volume 330 prior to replicating the set of files. For example, a first file may be originally stored on only a first data storage device 320 (e.g., an original data storage device) prior to replicating the first file. After the first file is replicated/copied onto other data storage devices, the first file may no longer be unique across the logical volume because other data storage devices may have a copy of the first file.

In one embodiment, the storage module 311 may replicate certain types of files onto different data storage devices 320. For example, the storage module 311 may identify data storage devices that have magnetic media and solid state media (e.g., flash memory). Image files may be replicated (copied) onto data storage devices 320 with magnetic media and word processing documents may be copied onto data storage devices with solid state media (e.g., flash memory). In another embodiment, the storage module 311 may replicate files with different files sizes onto different data storage devices 320. For example, files with sizes greater than a threshold size may be copied onto a first data storage device 320 and files with sizes less than a threshold size may be copied onto a second data storage device 320.

In one embodiment, the storage module 311 may identify health statutes of the data storage devices 320 (of the logical volume 330). For example, the storage module 311 may determine obtain operating information about a data storage device 320. The storage module 311 may obtain the operating information using various methods, such as Self-Monitoring, Analysis and Reporting Technology (SMART) diagnostics. The operating information may include data/information such as how long a data storage device 320 has been in operation, how many read operations and/or write operations have been performed on a data storage device 320, a number of errors (e.g., read/write errors) that have occurred on the data storage device 320, an estimated time to failure for the data storage device 320, etc. The storage module 311 may determine a health status for the data storage device 320 based on the operating information. For example, the storage module 311 may determine (e.g., generate/calculate) metric or value (or a set of metrics/values) to indicate the health of a data storage device 320. The storage module 311 may identify data storage devices 320 that have a health statuses above (e.g., greater than) or value or set of values.

In one embodiment, the storage module 311 may create and/or update a file list to indicate the one or more data storage devices 320 where a set of files has been copied. For example, a file may be replicated on (e.g., copied to) three data storage devices 320 (of the logical volume 330). The storage module 311 may update the file list to indicate that the file has been replicated on the three data storage devices. The file list is discussed in more detail below.

In one embodiment, the storage module 311 may monitor one or more files (e.g., a set of files across the logical volume). For example, the storage module 311 may monitor files stored on a data storage device and the copies of the files that are replicated on one or more additional data storage devices 320. The storage module 311 may determine that one or more copies of a first file has been modified based on the analysis of the one or more copies of the first file.

In one embodiment, the storage module 311 may using a hash function/algorithm (such as MD5) to determine whether any copies of the first file have been modified. For example, the storage module 311 may create hashes of the one or more copies of the first file (e.g., apply the hash function/algorithm to the one or more copies of the first file). The storage module 311 may compare the hashes of the one or more copies to determine if any copies of the first file have been modified (e.g., have been updated). For example, if a first hash of one copy of the first file does not match a second hash of another copy of the first file, the storage module 311 may determine that one or more copies of the first file have been modified. In another embodiment, the storage module 311 may compare timestamps and/or file sizes of copies of the first file to determine whether any copies of the first file have been modified. For example, the storage module 311 may determine that a first timestamp and/or a first file size of one copy of the first file is different from a second timestamp and/or a second file size of another copy of the first file.

In one embodiment, the storage module 311 may update one or more files that have been modified. The storage module 311 may update the one or more files (that have been modified) across the logical volume 330 (e.g., across all data storage devices 320 that include the one or more files). For example, the storage module 311 may determine that one or more copies of a first file has been modified (based on hashes, timestamps, and/or file sizes, as discussed above). The storage module 311 may update the first file across the logical volume 330. For example, the storage module 311 may identify the latest copy of the first file and may copy the latest copy of the first file to all the data storage devices 320 that include the first file (e.g., may copy the latest copy of the first file to all data storage devices 320 on which the first file is replicated or stored).

In one embodiment, the storage module 311 may receive a request to add an additional data storage device (e.g., a standalone DAS device such as a portable external hard drive, a standalone NAS device, etc.) to the logical volume 330. For example, a user may connect or couple the additional data storage device to the connector hub 306 and may provide user input via a GUI (which may be provided and/or presented by the storage module 311) and/or a configuration file to indicate that the additional data storage device is to be added to the logical volume 330. In one embodiment, the storage module 311 may also receive user input (e.g., via a GUI or configuration file) indicating an amount of storage space on the additional data storage device that may be used to replicate files. For example, the storage module 311 may receive user input indicating that two gigabytes of storage space on the additional data storage device may be used to replicate files. In another example, the storage module 311 may receive user input indicate that fifty percent of the total storage space/capacity of the additional data storage device may be used to replicate files.

The storage module 311 may add the additional data storage device to the logical volume 330 based on the request. For example, the storage module 311 may update the file list to indicate that the additional storage device has been added to the logical volume 330. In one embodiment, the storage module 311 may identify files on the additional data storage device that are unique across the logical volume 330 after the additional data storage device has been added to the logical volume 330. For example, the storage module 311 may identify files that have not been replicated on (e.g., copied to) other data storage devices 320 in the logical volume 330. In another example, a user may provide user input identifying one or more files that have not be replicated to other data storage devices 320. The storage module 311 may replicate one or more of the files (that have not been replicated) based on a protection level (as discussed above). In another embodiment, the storage module 311 may replicate (e.g., copy) files from other data storage device 320 onto the additional data storage device after the additional data storage device has been added to the logical volume 330.

In one embodiment, the storage module 311 may receive a request to remove a first data storage device 320 from the logical volume 330. For example, a user may disconnect/uncouple the first data storage device from the connector hub 306 and may provide user input via a GUI (which may be provided and/or presented by the storage module 311) and/or a configuration file to indicate that the first data storage device 320 is to be removed from the logical volume 330. The storage module 311 may identify a set of files (e.g., one or more files) that are replicated on the first data storage device 320. For example, the storage module 311 may identify a set of files that were copied onto the first data storage device 320 (e.g., replicated on the first data storage device 320) from other data storage devices 320 in the logical volume 330. The storage module 311 may copy the set of files (that are replicated on the first data storage device 320) to one or more other data storage devices 320 in the logical volume 330. For example, the storage module 311 may identify one or more other data storage devices 320 based on storage parameters (as discussed above) and may copy the set of files to the one or more other data storage devices 320. This may allow the storage module 311 to replicate the set of files across the logical volume 330 based on the one or more protection levels for the set of files. For example, the storage module 311 may copy a first file from the set of files to another data storage device 320 to maintain a minimum number of copies of the first file on different data storage devices 320, based on the protection level for the first file. The storage module 311 may remove the first data storage device 320 from the logical volume 330 based on the request. For example, the storage module 311 may disassociate the first data storage device 320 from the logical volume 330 and/or may update a file list to indicate that the first data storage device is no longer part of the logical volume 330. The storage module 311 may also remove the set of files from the first data storage device 320 (e.g., may delete the set of files that are replicated on the first data storage device 320).

In another embodiment, the storage module 311 may determine that a first data storage device 320 from logical volume 330 is inoperable (e.g., has failed, is no longer operating, etc.). For example, the storage module 311 may periodically communicate (e.g., send/receive messages, frames, data, etc.) with the first data storage device 320. The storage module 311 may determine that the first data storage devices is inoperable when the storage module 311 is no longer able to periodically communicate with the first data storage device 320. In another example, the storage module 311 may receive data from the first data storage device 320 (e.g., error messages) indicating that the first data storage device 320 is inoperable. The storage module 311 may identify a set of files that were copied onto the first data storage device 320 (e.g., replicated on the first data storage device 320) from other data storage devices 320 in the logical volume 330. The storage module 311 may replicate (e.g., copy) the set of files onto other data storage devices 320 to maintain a minimum number of copies of the set of files across the logical volume 330.

In one embodiment, the storage module 311 may determine that a first data storage device 320 of the logical volume 330 is to be temporarily removed from the logical volume 330 (e.g., temporarily unplugged or uncoupled from the connector hub 306 or the network 305). For example, a user may provide user input via a GUI (which may be provided and/or presented by the storage module 311) and/or a configuration file to indicate that the first data storage device 320 is to temporarily be removed from the logical volume 330 (e.g., indicate that the first data storage device 320 will be removed from the logical volume 330 and will be re-inserted into the logical volume 330 at a later time). The storage module may identify a set of files (e.g., one or more files) that are replicated on the first data storage device 320 and may copy the set of files (that are replicated on the first data storage device 320) to one or more other data storage devices 320 in the logical volume 330, as discussed above. This may allow the storage module 311 to replicate the set of files across the logical volume 330 based on the one or more protection levels for the set of files (e.g., to maintain a minimum number of copies of the set of files), as discussed above.

In another embodiment, the storage module 311 may determine that the first data storage device 320 (that was temporarily removed from the logical volume 330) has been re-inserted into the logical volume 330. For example, a user may re-connect or re-couple the data storage device 320 to the network 305 or the connector hub 306 or the user input via a GUI (which may be provided and/or presented by the storage module 311) and/or a configuration file to indicate that the first data storage device 320 has been re-inserted into the logical volume. The storage module 311 may remove the set of files that were replicated on the first data storage device 320 because the set of files was replicated (e.g. copied) onto other data storage devices 320 of the logical volume 330 when the first data storage device 320 was temporarily removed from the logical volume 330.

In one embodiment, the storage module 311 may cause files that are stored and/or replicated on the data storage devices 320 of the logical volume 330 to be encrypted. For example, the storage module 311 may include an encryption module (e.g., software, hardware, firmware or a combination thereof) that may encrypt the files. In another example, the data storage devices 320 may include encryption modules and the storage module 311 may send messages, instructions, data, etc., to the encryption modules indicating the files that are stored and/or replicated on the data storage devices 320 are to be encrypted.

In one embodiment, the storage module 311 may monitor the health statuses of the data storage devices 320. The storage module 311 may identify one or more data storage devices 320 with health statuses that are below or less than a set of values. For example, the storage module 311 may identify data storage devices 320 with an estimated life that is below a certain value. In another example, the storage module 311 may identify a data storage device 320 where errors that have occurred on the data storage device 320 (e.g., errors have occurred while reading/writing data on the data storage device 320). The storage module 311 may copy the files on the one or more data storage devices 320 (e.g., files that were originally stored on the one or more data storage devices 320 and files that were replicated on the one or more data storage devices 320) to other data storage devices 320 in the logical volume when the health statuses of the one or more drives are below the set of values.

FIG. 4 is a diagram of an example file list 400, according to an embodiment. Although the file list 400 illustrated in FIG. 4 is shown in the form of a table, it shall be understood that in other embodiments, the data/information illustrated in the file list 400 may be represented using various other formats. The file list 400 includes multiple rows. In one embodiment, each row may represent a file that is stored and/or replicated on one or more data storage devices of a logical volume.

In one embodiment, the file list 400 includes a "File Name" column, a "Metadata" column, an "Original Drive" column, and a "Copy Drives" column. The File Name column may indicate the path (which may be optional) and the name of a file represented by a row. For example, the file list 400 indicates that the file represented by the first row has a path/file name of "(path1)/file1." The Metadata column may indicate metadata associated with a file identified in the File Name column. For example, the file list 400 indicates that the file "filet" may have a timestamp, a file size, a hash (e.g., hash value generated using a hash function/algorithm), etc. It shall be understood that the metadata illustrated in FIG. 4 are merely examples and that other metadata (e.g., an owner/author of a file, security attributes such as read only, etc.) may be included in the Metadata column.

The Original Drive column may indicate where a file was originally stored before the file was replicated across the logical volume 330 (e.g., before the file was copied onto one or more other data storage devices in the logical volume 330). For example, the file list 400 indicates that the file "file1" was originally stored on a data storage device identified as "Drive 2." The Original Drive column may include a name, a serial number, a model number, and/or other data that may be used to identify data storage devices. The Copy Drive column may indicate which data storage devices a file has been replicated on. For example, the file list 400 indicates that the file "file1" has been replicated onto (e.g., copied onto) data storage devices identified as "Drive 1" and "Drive 3." In one embodiment, the file list 400 may also include a list of all of the data storage devices that are in the logical volume. For example, the file list 400 may include names, serial numbers, model numbers, and/or other data that may be used to identify the data storage devices that are in the logical volume.

In one embodiment, the file list 400 may be created and/or updated by a storage module, as discussed above. For example, the storage module may update the file list 400 when data storage devices are added to and/or removed from the logical volume (as discussed above). The storage module may also update the file table when one or more protection levels for one or more files are updated (as discussed above).

Figure 5:
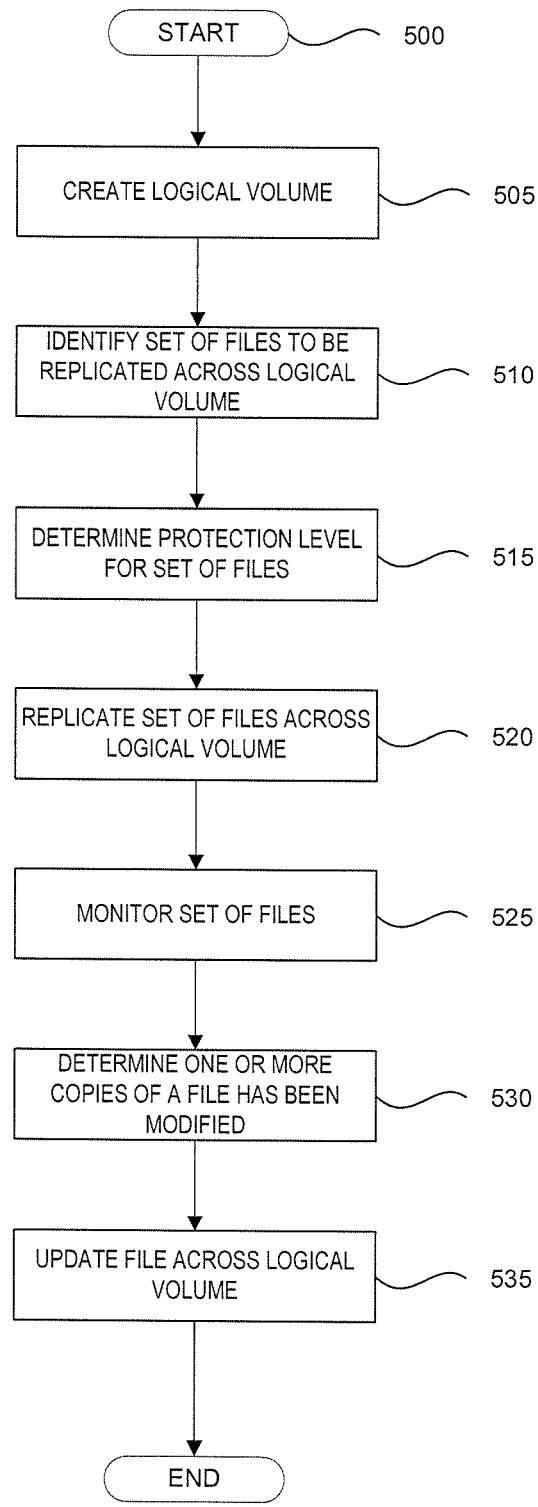
FIG. 5 is a flow diagram illustrating a process for replicating data across a logical volume, according to an embodiment.

FIG. 5 is a flow diagram illustrating a process 500 for replicating data across a logical volume, according to an embodiment. The process 500 may be performed by a controller and/or a storage module, as illustrated and discussed above in conjunction with FIGS. 1-3. The controller and the storage module may each be processing logic that includes hardware (e.g., circuitry, dedicated logic, programmable logic, microcode, etc.), software (e.g., instructions run on a processor to perform hardware simulation), firmware, or a combination thereof.

The process 500 begins at block 505 where the process 500 creates a logical volume. For example, the process 500 may receive input identifying data storage devices that are to be included in the logical volume and may group/aggregate the data storage devices 320 (e.g., may associate the data storage devices 320 with the logical volume 330 or may include the data storage devices 320 in the logical volume 330), as discussed above. At block 510, the process 500 may identify a set of files to be replicated across the logical volume. For example, the process 500 may receive user input (via a GUI) identifying one or more files that are to be replicate across the logical volume, as discussed above. At block 515, the process 500 determines the protection level for the set of files. For example, the process 500 may receive user input indicating one or more protection levels for the set of files, as discussed above. At block 520, the process 500 may replicate the set of files across the logical volume. For example, the process 500 may copy the set of files onto one or more additional data storage devices of the logical volume based on the one or more protection levels. At block 525, the process 500 may monitor the set of files. For example, the process 500 may analyze hashes of the set of files and/or timestamps of the set of files. The process 500 may determine that one or more copies of a file (or multiple files) has been modified. For example, the process 500 may determine that hashes of the copies of file are different or the timestamps of the copies of the file are different, as discussed above. The process 500 may update the file across the logical volume at block 535. For example, the process 500 may replicate a latest copy of the file onto other data storage devices that include a copy of the file, as discussed above.

Figure 6:
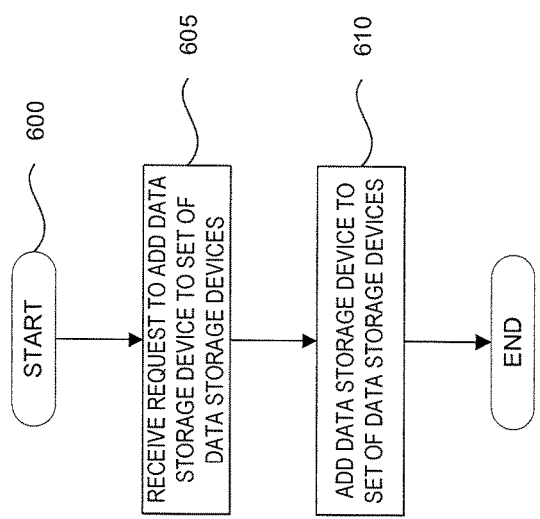
FIG. 6 is a flow diagram illustrating a process for adding a data storage device to a logical volume, according to an embodiment.

FIG. 6 is a flow diagram illustrating a process 600 for adding a data storage device to a logical volume, according to an embodiment. The process 600 may be performed by a controller and/or a storage module, as illustrated and discussed above in conjunction with FIGS. 1-3. The controller and the storage module may each be processing logic that includes hardware (e.g., circuitry, dedicated logic, programmable logic, microcode, etc.), software (e.g., instructions run on a processor to perform hardware simulation), firmware, or a combination thereof.

The process 600 begins at block 605 where the process 600 receive a request to add a data storage device to the logical volume. For example, the process 600 may receive user input via a GUI and/or may detect that a data storage device has been coupled to a connector hub or network, as discussed above. At block 601, the process 600 may add the data storage device to the logical volume. For example, the process 600 may update a file table to indicate that the data storage device is part of the logical volume, as discussed above.

Figure 7:
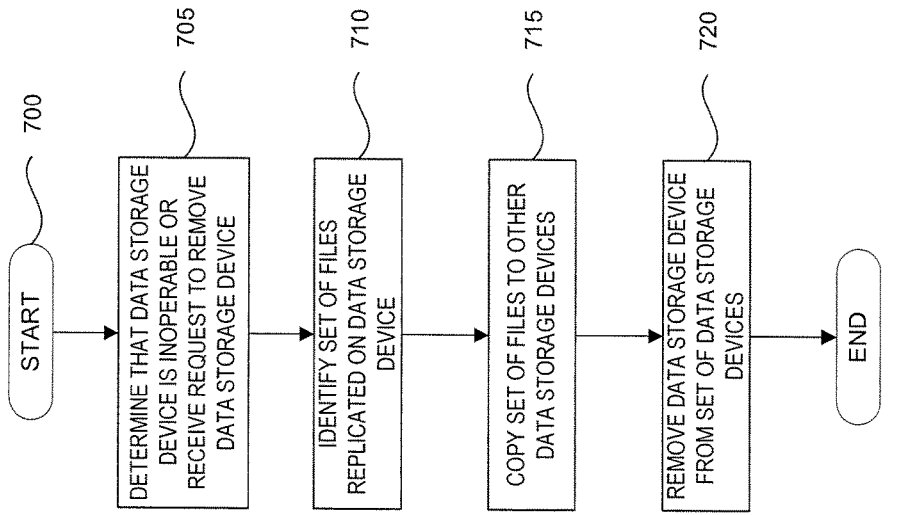
FIG. 7 is a flow diagram illustrating a process for removing a data storage device from a logical volume, according to an embodiment.

FIG. 7 is a flow diagram illustrating a process 700 for removing a data storage device from a logical volume, according to an embodiment. The process 700 may be performed by a controller and/or a storage module, as illustrated and discussed above in conjunction with FIGS. 1-3. The controller and the storage module may each be processing logic that includes hardware (e.g., circuitry, dedicated logic, programmable logic, microcode, etc.), software (e.g., instructions run on a processor to perform hardware simulation), firmware, or a combination thereof.

The process 700 begins at block 705 where the process 700 determines that a data storage device is no longer operable or where the process 700 receives a request to remove the data storage device from the logical volume. For example, the process 700 may receive one or more error messages from the data storage device, as discussed above. In another example the process 700 may receive user input indicating that a user wants to remove the data storage device from the logical volume. At block 710, the process 700 may identify a set of files that are replicated on the data storage device, as discussed above. At block 715, the process 700 may copy the set of files to one or more other data storage devices in the logical volume (e.g., to maintain a minimum number of copies of the set of files across the logical volume) based on the protection level. For example, the process 700 may identify one or more other data storage devices based on health statuses of the one or more data storage devices and may copy the set of files the one or more other data storage devices, as discussed above. At block 720, the process 700 may remove the data storage device from the logical volume. For example, the process 700 may update a file list to indicate that the data storage device is no longer part of the logical volume, as discussed above.

Figure 8:
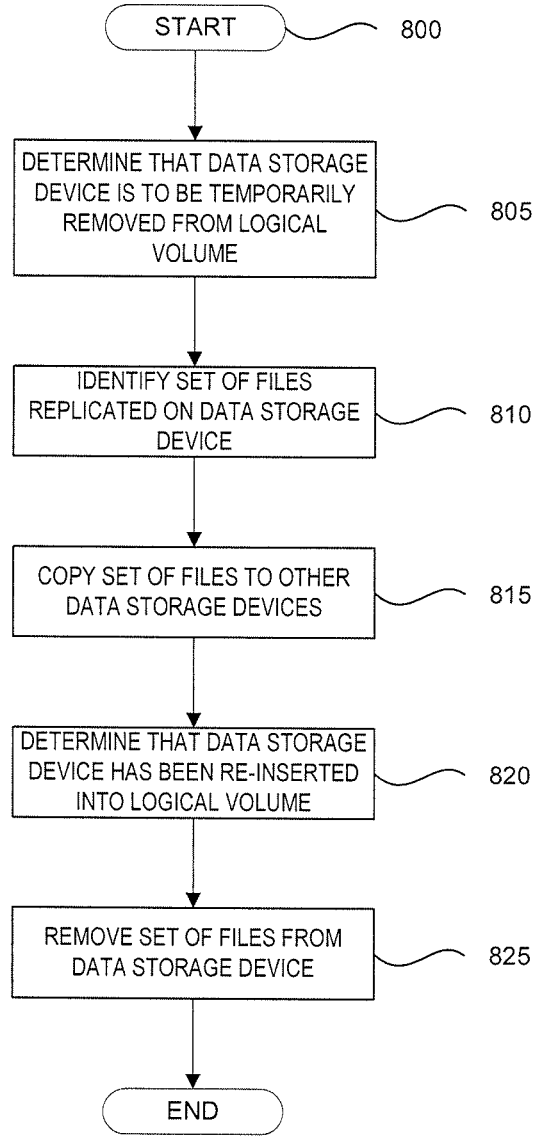
FIG. 8 is a flow diagram illustrating a process for temporarily removing a data storage device from a logical volume, according to an embodiment.

FIG. 8 is a flow diagram illustrating a process 800 for temporarily removing a data storage device from a logical volume, according to an embodiment. The process 800 may be performed by a controller and/or a storage module, as illustrated and discussed above in conjunction with FIGS. 1-3. The controller and the storage module may each be processing logic that includes hardware (e.g., circuitry, dedicated logic, programmable logic, microcode, etc.), software (e.g., instructions run on a processor to perform hardware simulation), firmware, or a combination thereof.

The process 800 begins at block 805 where the process 800 determines that a data storage device is to be temporarily removed from the logical volume. For example, the process 800 may receive user input (via a GUI) identifying the data storage device that is to be temporarily removed from the logical volume. At block 810, the process 800 may identify a set of files that are replicated on the data storage device, as discussed above. At block 815, the process 800 may copy the set of files to one or more other data storage devices in the logical volume (e.g., to maintain a minimum number of copies of the set of files across the logical volume) based on the protection level. For example, the process 800 may identify one or more other data storage devices based on health statuses of the one or more data storage devices and may copy the set of files to the one or more other data storage devices, as discussed above. At block 820, the process 800 may determine that the data storage device has been re-inserted into the logical volume. For example, the process 800 determine that the data storage devices has been reconnected to a connector hub or network, as discussed above. At block 825, the process 800 may remove the set of files (e.g., delete the set of files) that were replicated on the data storage device. For example, the process 800 may remove the set of files because the set of files were copied onto one or more other data storage devices at block 815.

Figure 9:
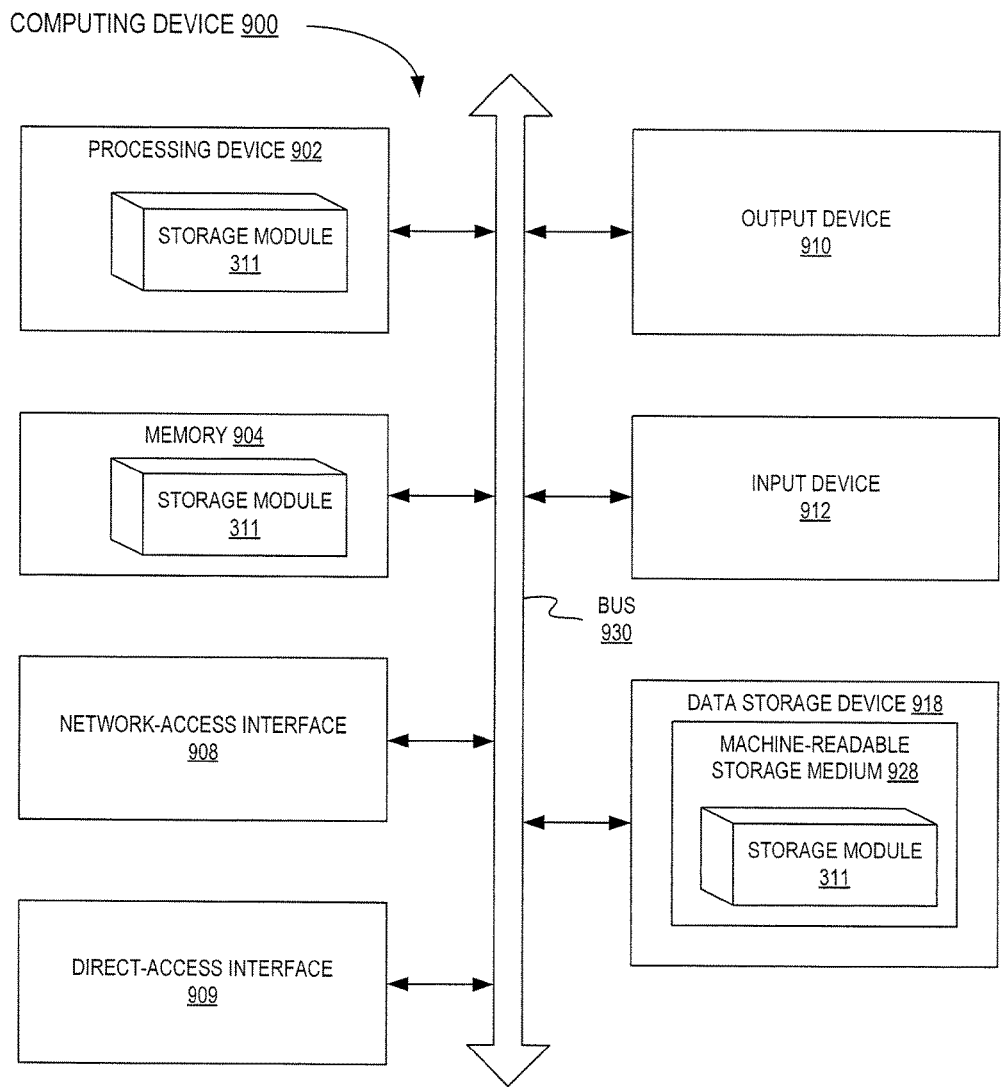
FIG. 9 is a diagram of a computing device, according to an embodiment.

FIG. 9 is a diagram of a computing device 900, according to an embodiment. The computing device 900 may execute instructions that may cause the computing device 900 to perform any one or more of the methodologies (e.g., operations, methods, functions, etc.) discussed herein, may be executed. The computing device 900 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 900 includes a processing device (e.g., a processor, a controller, a central processing unit (CPU), etc.) 902, a main memory 904 (e.g., read-only memory (ROM), flash memory, dynamic random access memory (DRAM) such as synchronous DRAM (SDRAM)), a network-access interface 908, a direct-access interface 909, an output device, 910, an input device 912, and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute storage module 311 for performing the operations and steps discussed herein.

The computing device 900 may include a network-access interface 908 (e.g., a network interface card, a Wi-Fi interface, etc.) which may communicate with a network (e.g., network 105 illustrated in FIG. 1). The computing device may also include a direct access interface 909 (e.g., a USB interface, an eSATA interface, a Thunderbolt interface, etc.). The computing device 900 also may include an output device 910 (e.g., a liquid crystal display (LCD) or a cathode ray tube (CRT)), and an input device 912 (e.g., a mouse, a keyboard, etc.). In one embodiment, the output device 910 and the input device 912 may be combined into a single component or device (e.g., an LCD touch screen).

The data storage device 918 may include a computer-readable storage medium 928 on which is stored one or more sets of instructions (e.g., storage module 311) embodying any one or more of the methodologies or functions described herein. The storage module 311 may also reside, completely or at least partially, within the main memory 904 and/or within the processing device 902 during execution thereof by the computing device 900. The main memory 904 and the processing device 902 may also constitute computer-readable media. The instructions may further be transmitted or received over via the network-access interface 908 and/or direct-access interface 909.

While the computer-readable storage medium 928 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

Additional Embodiments

Those skilled in the art will appreciate that in some embodiments, other types of distributed data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. An apparatus for replicating files across standalone data storage devices, the apparatus comprising:
   a communication interface configured to be coupled to a set of external standalone data storage devices; and
   a controller coupled to the communication interface, the controller configured to:
      create a logical volume comprising the set of external standalone data storage devices;
      identify a set of files stored to be replicated across the logical volume;
      determine one or more protection levels for the set of files, wherein:
         the one or more protection levels are applied across the logical volume; and
         the one or more protection levels indicate a desired number of copies to be stored in the logical volume;
      replicate the set of files across the logical volume such that a minimum number of copies of the set of files is made on the logical volume based on the one or more protection levels;
      in response to determining that a first external standalone data storage device from the set of external standalone data storage devices is to be temporarily removed from the logical volume:
         identify a second set of files from the set of files that are replicated on the first external standalone data storage device; and
         copy the second set of files on the first external standalone data storage device to other external standalone data storage devices in the set of external standalone data storage devices such that a minimum number of copies for the second set of files is maintained in the logical volume in accordance with one or more protection levels for the second set of files; and
      in response to determining that the first external standalone data storage device has been re-inserted into the logical volume:
         remove the second set of files from the first external standalone data storage device.

2. The apparatus of claim 1, wherein the controller is further configured to:
   monitor the set of files across the logical volume;
   determine that one or more copies of a first file from the set of files has been modified; and
   update the first file across the logical volume.

3. The apparatus of claim 2, wherein the controller is configured to determine that one or more copies of the first file from the set of files has been modified by:
   comparing one or more hashes of the one or more copies of the first file.

4. The apparatus of claim 2, wherein the controller is configured to determine that one or more copies of the first file from the set of files has been modified by comparing one or more of:
   timestamps associated with the one or more copies of the first file, or
   file sizes associated with the one or more copies of the first file.

5. The apparatus of claim 1, wherein replicating the set of files across the logical volume comprises:
   identifying a first file from the set of files, wherein the first file is located on a first external standalone data storage device of the set of external standalone data storage devices;
   identifying one or more additional data storage devices from the set of external standalone data storage devices based on a set of storage parameters; and
   copying the first file to the one or more additional data storage devices based on the one or more protection levels.

6. The apparatus of claim 5, wherein the controller is further configured to:
   update a file list to indicate that the set of files is copied on the one or more additional data storage devices.

7. The apparatus of claim 5, wherein the set of storage parameters comprises one or more of:
   a type of the first file;
   a size of the first file;
   one or more health statuses of the one or more additional data storage devices;
   one or more types of the one or more additional data storage devices; or
   a number of times the first file has been accessed.

8. The apparatus of claim 1, wherein creating the logical volume comprises:
   aggregating the set of external standalone data storage devices to form the logical volume.

9. The apparatus of claim 1, wherein creating the logical volume comprises:
   allocating an amount of space for replicating files on each external standalone data storage device of the set of external standalone data storage devices.

10. The apparatus of claim 1, wherein the set of files is identified based on one or more of:
    file types of the set of files;
    file sizes of the set of files;
    numbers of times the set of files have been accessed; or
    extensions of the set of files.

11. The apparatus of claim 1, wherein the set of files is unique across the logical volume prior to replicating the set of files.

12. The apparatus of claim 1, wherein the controller is further configured to:
    receive a request to add an additional external standalone data storage device to the logical volume; and
    add the additional external standalone data storage device to the logical volume based on the request.

13. The apparatus of claim 1, wherein the controller is further configured to:
    receive a request to remove the first external standalone data storage device from the set of external standalone data storage devices; and
    remove the first external standalone data storage device from the set of external standalone data storage devices.

14. The apparatus of claim 1, wherein the controller is further configured to:

determine that the first external standalone data storage device from the set of external standalone data storage devices is inoperable; and remove the first external standalone data storage device from the set of external standalone data storage devices.

15. The apparatus of claim 1, wherein the controller is further configured to:

cause the set of files to be encrypted.

16. The apparatus of claim 1, wherein the set of external standalone data storage devices comprises:

one or more of a direct-access storage device or a network-access storage device.

17. A method for replicating files across standalone data storage devices, the method comprising:

connecting to a set of external standalone data storage devices;

creating a logical volume comprising the set of external standalone data storage devices;

identifying a set of files stored to be replicated across the logical volume;

determining one or more protection levels for the set of files, wherein:

the one or more protection levels are applied across the logical volume; and the one or more protection levels indicate a desired number of copies to be stored in the logical volume;

replicating the set of files across the logical volume such that a minimum number of copies of the set of files is made on the logical volume based on the one or more protection levels;

in response to determining that a first external standalone data storage device from the set of external standalone data storage devices is to be temporarily removed from the logical volume:

identifying a second set of files from the set of files that are replicated on the first external standalone data storage device; and copying the second set of files on the first external standalone data storage device to other external standalone data storage devices in the set of external standalone data storage devices such that a minimum number of copies for the second set of files is maintained in the logical volume in accordance with one or more protection levels for the second set of files; and in response to determining that the first external standalone data storage device has been re-inserted into the logical volume:

removing the second set of files from the first external standalone data storage device.

18. The method of claim 17, further comprising:
monitoring the set of files across the logical volume;

determining that one or more copies of a first file from the set of files has been modified by comparing one or more hashes of the one or more copies of the first file; and updating the first file across the logical volume.

19. An apparatus for replicating files across standalone data storage devices, the apparatus comprising:

a communication means configured to be coupled to a set of external standalone data storage devices; and a processing means coupled to the communication means, the processing means configured to:

create a logical volume comprising the set of external standalone data storage devices;

identify a set of files stored to be replicated across the logical volume;

determine one or more protection levels for the set of files, wherein:

the one or more protection levels are applied across the logical volume; and the one or more protection levels indicate a desired number of copies to be stored in the logical volume;

replicate the set of files across the logical volume such that a minimum number of copies of the set of files is made on the logical volume based on the one or more protection levels;

in response to determining that a first external standalone data storage device from the set of external standalone data storage devices is to be temporarily removed from the logical volume:

identify a second set of files from the set of files that are replicated on the first external standalone data storage device; and copy the second set of files on the first external standalone data storage device to other external standalone data storage devices in the set of external standalone data storage devices such that a minimum number of copies for the second set of files is maintained in the logical volume in accordance with one or more protection levels for the second set of files; and in response to determining that the first external standalone data storage device has been re-inserted into the logical volume:

remove the second set of files from the first external standalone data storage device.

20. The apparatus of claim 19, wherein the processing means is further configured to:

monitor the set of files across the logical volume;

determine that one or more copies of a first file from the set of files has been modified by comparing one or more hashes of the one or more copies of the first file; and update the first file across the logical volume.

* * * * *